3,574,177
PRODUCTION OF ACRYLONITRILE POLYMERS
Akira Nakajima, Kenji Takeya, and Yukio Shimosaka, Saidaiji, Japan, assignors to Japan Exlan Company Limited, Osaka, Japan
No Drawing. Continuation-in-part of abandoned application Ser. No. 397,652, Sept. 18, 1964. This application May 8, 1968, Ser. No. 727,670
Claims priority, application Japan, Sept. 23, 1963, 38/51,151
Int. Cl. C08f 3/76, 15/22
U.S. Cl. 260—88.7                                  11 Claims

ABSTRACT OF THE DISCLOSURE

The solution polymerization of acrylonitrile polymers and copolymers is facilitated when it is conducted under agitation in the presence of an inert dispersion medium. The solvent used is one that will dissolve both the monomer and the resulting polymer. The dispersion medium is a liquid that is not uniformly miscible with the solvent and it will not dissolve either the monomer or the polymer. Upon permitting the reaction product, a dispersion, to stand quietly it separates into two liquid phases that can be separated by decantation. The preferred dispersion media are liquid hydrocarbons, halogenated or not, that have a boiling point above 268° C.

---

This application is a continuation-in-part of U.S. application Ser. No. 397,652, filed Sept. 18, 1964, now abandoned.

The present invention relates to the production of acrylonitrile polymers, and more particularly to an improvement of the solution polymerization of acrylonitrile or acrylonitrile and other copolymerizable ethylenically unsaturated monomer(s).

The commercial production of acrylonitrile polymers has already been in progress in the field of synthetic fibers. As is well known the method for the production of such polymers may be divided into two major classes. One is the aqueous emulsion or suspension polymerization process which is carried out in an aqueous medium not dissolving the polymer, and the other is the solution polymerization process which is carried out in a solvent for the polymer.

Whereas the polymer produced by such aqueous process must be separated from the aqueous medium, purified, and dissolved in a solvent before it can be formed into articles, the polymer solution obtainable directly from the solution polymerization process can be directly used for forming articles after the impurities such as unreacted materials have been removed from the solution.

The solution polymerization process, however, is disadvantageous in that the viscosity of the solution rises as the polymerization proceeds, and therefore a greater force is required to effect uniform stirring and the temperature control such as the removal of heat of polymerization is difficult. For this reason, most of the existing commercial production of acrylonitrile polymers utilize the aqueous emulsion polymerization method.

Therefore a primary object of this invention is to eliminate the aforementioned drawbacks of the conventional solution polymerization process, e.g. difficulties in stirring and temperature control, thereby establishing a commercially improved and profitable process of solution polymerization.

From the studies made to accomplish the aforesaid object, we have found that both the effective stirring and temperature control may be effected easily if the polymerization is conducted in a mixed medium of (1) a solvent which is capable of dissolving the monomer and the resulting polymer and (2) a dispersion medium which is not uniformly miscible with said solvent and does not dissolve the monomer and resulting polymer.

The present invention is applicable not only to the polymerization of acrylonitrile alone but also to copolymerization of acrylonitrile and one or more of ethylenically unsaturated compounds copolymerizable therewith.

The ethylenically unsaturated compounds that may be employed in the invention may be exemplified by acrylic acid, methacrylic acid, methyl methacrylate, ethyl methacrylate, butyl methacrylate, octyl methacrylate, methoxyethyl methacrylate, phenyl methacrylate, cyclohexyl methacrylate, dimethylamidethyl methacrylate, etc., as well as the corresponding esters of acrylic acid, acrylamides and methacrylamides as well as the alkylation products thereof, unsaturated ketones such as methylvinyl ketone, phenylvinyl ketone, methylisopropenyl ketone, etc., vinyl carboxylates such as vinyl formate, vinyl acetate, vinyl propionate, vinyl butylate, vinyl thioracetate, vinyl benzoate, etc., the esters of ethylene-$\alpha$-$\beta$-carboxylates such as maleic acid, fumaric acid, citraconic acid, mesaconic acid, aconitic acid, etc., N-alkyl-maleinimide, N-vinylcarbazole, N-vinylsuccinimide, N-vinylphthalimide, vinyl ester, vinyl-pyridines such as 2-vinyl-pyridine, 4-vinylpyridine, 2-methyl-5-vinylpyridine, etc., styrene and the alkylation products thereof, allyl-alcohol, vinyl chloride, vinylidene chloride, allylsulfonic acid, methallylsulfonic acid, styrene sulfonic acid and other unsaturated sulfonic acids, as well as the water-soluble salts thereof.

When a monomeric mixture is used it is preferable that acrylonitrile is predominant, e.g. more than 85% by weight based on the total monomer weight.

It should also be understood that the polymerization method of the present invention may not only be applied to the ordinary homo-polymerization and copolymerization process, but also to the graft and block copolymerization processes.

The solvent and dispersion medium to be used according to the present invention should have the following properties respectively. The solvent is used to dissolve both the monomer and the polymer, and may be selected from among various organic solvents such as dimethyl sulfone, sulfolane, dimethyl acetamide, dimethyl sulfoxide, dimethyl formamide, dimethyl methoxy-acetamide, dimethyl thioformamide, $\epsilon$-caprolactam, succinonitrile, malononitrile, fumaronitrile, adiponitrile, ethylene cyanhydrine, hydroxy-acetonitrile, acetonitrile, bis-cyanobutyl-sulfone, $\alpha$-cyanoacetoamide, $\gamma$-butyrolactone, nitrophenol, phenylenediamine, ethylene carbonate, $\beta$-propiolactone, nitromethane, etc., concentrated aqueous solution of various inorganic salts such as halogenides, perchlorates, thiocyanates, nitrates, etc., e.g. of lithium, zinc, aluminum, calcium, magnesium, cobalt, manganese, sodium potassium, etc., and concentrated aqueous solution of strong acids such as nitric acid, hydrochloric acid, sulfuric acid, and the like. It is also possible to employ a mixture of two or more of the aforementioned organic and inorganic solvents.

The dispersion medium should be selected from those which do not dissolve the monomer and the polymer, and are not uniformly miscible with said solvent. Such medium may be exemplified by various paraffins and halogenated paraffins such as liquid or halogenated liquid petrolatum, a mixture of hydrocarbons represented by the general formula $C_nH_{2n+2}$ ($n$ is an integer greater than 15), and hydrocarbons of the above formula wherein the hydrogen atoms are partly substituted with Cl and/or Br. Said medium has a boiling point higher than 268° C.

The polymerization reaction of the invention may be initiated by means of any conventional polymerization catalyst, heat, light, radiation, etc. which is known in the art as initiating or promoting the polymerization. The polymerization catalyst mentioned just above may be any of the group consisting of various radical-releasing catalysts as well as those ionic polymerization catalysts which are capable of initiating the polymerization reaction in said solvent. Thus, for example, radical polymerization catalysts such as persulfates, e.g. potassium persulfate, ammonium persulfate, etc.; organic and inorganic peroxides, e.g. hydrogen peroxide, benzoyl peroxide, lauryl peroxide, etc.; azo-compounds, e.g. azobisisobutyronitrile; redox catalysts such as persulfate-reducing agent, chlorate-reducing agent; anionic polymerization catalysts such as those described in Table 7, page 429 of "Fortschritte der Hochpolymeren Forschung" (1961) by W. M. Thomas; alkali metals; sodium or potassium cyanide; sodium or potassium hydroxide and other strong alkalis; etc. may be used.

As a principle the mixing ratio of said solvent to said dispersion medium may be freely selected, but a choice is preferably made in consideration of the viscosity of the polymerization medium and the resulting ease or difficulty of stirring, as well as the ease of removing the heat of polymerization and controlling the temperature of said polymerization medium. Generally, 0.2–100 parts or more by weight of the dispersion medium is used per part of the solvent.

Furthermore, in utilizing the process of the present invention, it is possible to prepare a polymer solution which may be decanted and directly utilized in spinning. In order to prepare said polymer solution, one part or more by weight of said solvent is used per part of the monomer or monomers. If the solvent is used in amounts less than one part per part of the monomer or monomers, the produced polymer solution and the dispersion medium cannot be separated by decantation. Therefore, said polymer solution cannot be directly utilized in spinning.

The polymerization reaction in the copresence of said solvent and monomer is a conventional solution polymerization reaction, between the reaction is conducted in the presence of a third factor, i.e. dispersion medium, in addition to said two factors, the solution and dispersion phase are dispersed in the form of minute droplets separate and distinct from each other. While the polymerization reaction takes place only in the droplets of the solution phase, there is no difference between this process and the conventional aqueous process in the effects of stirring and temperature control. After the reaction is allowed to proceed to a predetermined extent, the stirring is suspended, whereupon the solution phase containing the resulting polymer is separated from the dispersion medium. Now that the two phase may be easily separated from each other by decantation, the solution phase may be transferred as such, or after the removal of unreacted monomers and impurities, to the subsequent spinning or forming process.

Except for the use of the dispersion medium, the polymerization may be carried out in a manner well known in the solution polymerization or copolymerization of acrylonitrile. For example, the polymerization may be conducted at a temperature of from −70° C. to 100° C. The process may be conducted continuously or batchwise.

This invention will be described in further detail by reference to the following examples, although the scope of the invention is by no means limited thereto.

EXAMPLE 1

A glass test-tube of about 35 cc. capacity was charged with 3 cc. of acrylonitrile, 5 cc. of solvent, 20 cc. of dispersion medium, and 0.15 gram of catalyst, and the atmosphere in the upper space of the tube was replaced with dry nitrogen gas. The tube was then sealed. The polymerization reaction was allowed to continue at 60° C. for 2 hours while the test tube was subjected to revolving agitation in a thermostatic oven. The types of of various reagents and the results are summarized in Table 1. It was found that the polymerization reaction proceeded satisfactorily and that when the agitation was suspended, there was obtained a solvent phase containing the resulting polymer upon separation of said phase from the dispersion phase.

TABLE 1

| No. | Solvent | Dispersing agent | Polymerization catalyst | Yield of polymer, percent | Molecular weight [1] |
|---|---|---|---|---|---|
| 1 | Dimethylformamide | Liquid petrolatum. | AIBN [2] | 31.7 | 32,700 |
| 2 | Dimethylsulfoxide | do | AIBN [2] | 52.9 | 36,100 |
| 3 | Ethylene carbonate | do | AIBN [2] | 56.2 | 45,900 |
| 4 | Gamma-butyrolactone | do | AIBN [2] | 38.0 | 36,000 |
| 5 | Sodium thiocyanate (50% aqueous solution). | do | AIBN [2] | 83.4 | 142,300 |
| 6 | Zinc chloride (50% aqueous solution). | do | APS [3] | 81.9 | 134,700 |
| 7 | Concentrated nitric acid | do | APS [3] | 24.6 | 6,500 |

[1] Calculated by Staudinger's equation.
[2] AIBN: azobisisobutyronitrile.
[3] APS: ammonium persulfate.

EXAMPLE 2

A 500 cc. conical flask furnished with an agitator, reflux condenser, and the thermometer was charged with 10 cc. of acrylonitrile, 100 cc. of solvent, 150 cc. of liquid petrolatum (as dispersion medium) and 0.5 gram of polymerization catalyst, and the polymerization reaction was allowed to continue at 60° C. for 1 hour while dry nitrogen gas was constantly introduced into the upper space.

The results are summarized in Table 2.

TABLE 2

| No. | Solvent (1) | Catalyst | Yield of polymer, percent | Molecular weight |
|---|---|---|---|---|
| 1 | Dimethylformamide | Azobisisobutyronitrile. | 48.4 | 64,700 |
| 2 | 50% aqueous solution of sodium thiocyanate. | Benzoyl peroxide. | 30.7 | 39,000 |

In both experiments, the slurry was separated into two phases upon suspension of the agitation when the polymerization reaction was completed. When the solvent phase of No. 2 slurry was separated by decantation and wet-spun in water, a white filament could be obtained. The solvent phase of No. 1 slurry could also be processed in water to form films.

EXAMPLE 3

A flask similar to the one in Example 2 was charged with 20 cc. of acrylonitrile, 200 cc. of a 50% aqueous solution of sodium thiocyanate, 1 gram of polymerization catalyst, i.e. azobisisobutyronitrile, and 1.2 g. of sodium metabisulfite and the polymerization reaction was conducted at 60° C. It was found impossible to continue agitation when 20% polymer yield was attained. In contrast, when the polymerization reaction was conducted in a medium which contained 250 cc. of liquid petrolatum as a dispersion medium, the agitation could be continued even after the yield of polymer exceeded 50%.

EXAMPLE 4

A flask similar to the one in Example 2 was charged with completely dehydrated, purified reagents in the following composition:

8 cc. of acrylonitrile.
2 cc. of methyl acrylate.
100 cc. of dimethyl formamide.
150 cc. of liquid petrolatum.

In streams of dry purified nitrogen gas and under constant agitation at 0° C., the polymerization reaction was conducted by adding 0.5 gram of sodium cyanide (as solution in dimethyl formamide) in small installments until the polymerization degree of 82% was attained. The agitation and temperature control could be effected satisfactorily. The solvent phase of the resulting slurry was separated by decantation, and when this phase was dropped into water, a pale-yellow film was obtained.

If the above recipe was employed but in the absence of the dispersion medium, the agitation had to be suspended even before the addition of a solution of sodium cyanate in dimethyl formamide was completed and the temperature rose beyond 30° C. so that the resulting polymer was yellowish brown.

EXAMPLE 5

A reaction vessel of glass furnished with a continuously operating agitator and held at 60° C. was continuously charged with a monomeric mixture (90 parts of acrylonitrile and 10 parts of methyl methacrylate), a solution of a polymerization catalyst in dimethyl formamide, and a dispersing agent (liquid petrolatum) in such a manner that the average residence time was 80 minutes. The reaction product was also continuously withdrawn from the vessel. The volumetric ratio of the monomeric mixture to the solvent was 1 to 3, while 5 parts of said polymerization catalyst, i.e. azobisisobutyronitrile, was used for 100 parts of the monomeric mixture and fed to the reaction vessel as a solution in dimethyl formamide which also served as a solvent for the monomers. Three hundred percent of said dispersing agent was employed based on the combined amount of the solvent and the monomers.

The reaction product was continuously withdrawn from the vessel when the reaction reached a stationary state, and while it contained the solvent and dispersion phases in uniform dispersion at this moment, the two phases were separated from each other when the product was left standing, and when the solvent phase was poured into water, a transparent film was obtained. The polymer yield was about 60%, and the intrinsic viscosity ($\mu$) value of the dimethyl formamide solution of the final polymer was 1.5.

When a similar experiment was conducted in the absence of the dispersion medium, the reaction system became so viscous even before a stationary state was reached that efficient agitation could not be effected.

This continuous process can, of course, be carried out using other monomers, solvents, dispersion media and polymerization aids.

EXAMPLE 6

An apparatus similar to the one disclosed in Example 2 was charged with 100 cc. of dimethyl formamide containing 5 grams of polyacrylonitrile, 150 cc. of a dispersing agent, i.e. liquid petrolatum, 5 grams of styrene, and 0.5 gram of a polymerization catalyst, i.e. azobisisobutyronitrile, and the polymerization reaction was allowed to continue at 60° C. for 1 hour with stirring while dry nitrogen gas was introduced into the upper space within the apparatus. When the polymerization reaction was completed and the agitation suspended, the slurry was divided into two distinct phases. So, these phases were separated from each other by decantation. The dimethylformamide phase was poured in methanol to precipitate the polymer, the yield of which was 7.3 grams. Taking advantage of the difference in solubility, the polymer was isolated. It was found that a graft copolymer consisting of a trunk of acrylonitrile and branches of styrene has been formed.

What is claimed is:

1. A method for producing an acrylonitrile polymer consisting of at least 85% by weight of acrylonitrile and from 0 to 15% by weight of at least one ethylenically unsaturated compound copolymerizable with acrylonitrile which comprises conducting solution polymerization of the monomer or mixture of monomers in the presence of (1) a solvent for the monomer or mixture of monomers and the resultant polymer and (2) a dispersion medium which is a non-solvent for the monomer or mixture of monomers and the resultant polymer and which is not uniformly miscible with said solvent, said dispersion medium being selected from the group consisting of liquid paraffins and halogenated liquid paraffins having a boiling point higher than 268° C., the ratio of said solvent to the dispersion medium being at least 1:0.2–100 parts by weight and the ratio of said solvent to the monomer or mixture of monomers being at least 1:1 parts by weight, said polymerization being conducted to the desired degree of polymerization while agitating the reaction mixture, ceasing said agitation, and permitting the two non-miscible phases to separate into two liquid layers which can be separated from each other by decantation.

2. A method as claimed in claim 1 wherein the solvent is selected from the group consisting of dimethyl formamide, dimethyl sulfoxide, dimethyl acetamide, ethylene carbonate, butyrolactone, concentrated aqueous solution of sodium thiocyanate, concentrated aqueous solution of nitric acid and concentrated aqueous solution of zinc chloride; and wherein the dispersion medium is selected from the group consisting of liquid and halogenated liquid petrolatum having a boiling point higher than 268° C.

3. A method as claimed in claim 2 wherein the polymerization is initiated by an initiator selected from the group consisting of radical releasing polymerization catalysts and ionic polymerization catalysts.

4. The method of claim 1 wherein the monomer or mixture of monomers, said solvent (1) for the monomer or mixture of monomers and the dispersion medium (2) are being continuously fed into a reaction vessel wherein the agitation occurs and the reaction product is continuously withdrawn from the vessel and permitted to separate into two liquid phases outside the vessel.

5. The method of claim 4 wherein the solvent is selected from the group consisting of dimethyl formamide, dimethyl sulfoxide, dimethyl acetamide, ethylene carbonate, butyrolacetone, concentrated aqueous solution of sodium thiocyanate, concentrated aqueous solution of nitric acid and concentrated aqueous solution of zinc chloride; and wherein the dispersion medium is selected from the group consisting of liquid and halogenated liquid petrolatum having a boiling point higher than 268° C.

6. A method as in claim 2 wherein a concentrated solution of sodium thiocyanate is used as the solvent.

7. A method as claimed in claim 2 wherein a concentrated aqueous solution of nitric acid is used as the solvent.

8. A method as claimed in claim 2 wherein a concentrated aqueous solution of zinc chloride is used as the solvent.

9. A method as claimed in claim 3 wherein the catalyst used to initiate the polymerization is azobisisobutyronitrile.

10. A method as claimed in claim 3, wherein the catalyst used to initiate the polymerization is an anionic polymerization catalyst.

11. A method as claimed in claim 3 wherein the catalyst used to initiate the polymerization is a peroxide catalyst.

(References on following page)

References Cited

UNITED STATES PATENTS

| | | | |
|---|---|---|---|
| 2,160,054 | 5/1939 | Bauer et al. | 260—88.7 |
| 2,699,433 | 1/1955 | Green et al. | 260—85.5 |
| 2,872,438 | 2/1959 | Carroll et al. | 260—85.5P |
| 2,982,762 | 5/1961 | Voeks et al. | 260—85.5P |
| 3,040,008 | 6/1962 | Wishman et al. | 260—85.5P |
| 3,218,302 | 11/1965 | McLamed | 260—88.7 |
| 3,234,303 | 2/1966 | Bild et al. | 260—85.5P |

HARRY WONG, Jr., Primary Examiner

U.S. Cl. X.R.

204—159.22; 260—29.1, 29.6, 30.4, 30.8, 32.4, 32.6, 63, 78.5, 79.3, 79.7, 85.5, 878